(12) United States Patent
Glass et al.

(10) Patent No.: US 6,341,280 B1
(45) Date of Patent: Jan. 22, 2002

(54) INLINE TREE FILTERS

(75) Inventors: Bryce Alan Glass, San Francisco; Paige K. Parsons, Atherton, both of CA (US)

(73) Assignee: Netscape Communications Corporation, Mountain View, CA (US)

( * ) Notice: Subject to any disclaimer, the term of this patent is extended or adjusted under 35 U.S.C. 154(b) by 0 days.

(21) Appl. No.: 09/183,863

(22) Filed: Oct. 30, 1998

(51) Int. Cl.[7] .............................................. G06F 17/30
(52) U.S. Cl. ............................. 707/3; 707/10; 707/100; 707/4
(58) Field of Search ......................... 345/357; 395/357, 395/160; 707/3–10, 100

(56) References Cited

U.S. PATENT DOCUMENTS

| | | | | |
|---|---|---|---|---|
| 5,412,776 A | * | 5/1995 | Bloomfield et al. | 345/333 |
| 5,515,487 A | * | 5/1996 | Beaudet et al. | 707/100 |
| 5,644,740 A | * | 7/1997 | Kiuchi | 395/357 |
| 5,877,766 A | * | 3/1999 | Bates et al. | 345/357 |
| 5,878,421 A | * | 3/1999 | Forrel et al. | 707/100 |
| 6,144,962 A | * | 11/2000 | Weinberg et al. | 707/10 |

* cited by examiner

*Primary Examiner*—Hosain T. Alam
*Assistant Examiner*—Cam-Y Truong
(74) *Attorney, Agent, or Firm*—Michael A. Glenn

(57) ABSTRACT

A common interface solution to the problem of burgeoning information sets, referred to as inline tree filters, structures the represented data in a hierarchical tree. Inline filters are information-filtration devices that are applied to a traditional interface element, such as a hierarchical tree viewer. The invention provides a technique that enables the user to choose selectively the data that they want to display, while not otherwise altering the behavior and interaction of the tree viewer itself. Inline tree filters are suitable for any graphical user interface that could potentially use a tree viewer.

20 Claims, 8 Drawing Sheets

INLINE TREE FILTERS

BACKGROUND OF THE INVENTION

1. Technical Field

The invention relates to the hierarchical viewing of the contents of an electronic environment. More particularly, the invention relates to the provision of inline tree filters for use in viewing the contents of an electronic environment.

2. Description of the Prior Art

The amount of information that computer users need to view and manipulate is growing at an exponential rate. Most traditional graphical user interfaces were designed when the amounts of information one had to view on the desktop was relatively small. The popularization of networked computing and the rise of the Internet has created a need for the design of new data-manipulation models, or the enhancement of existing models.

Although their appearance and interaction behavior in different environments varies, hierarchical trees have become the most ubiquitous data manipulation tool used in modern operating systems such as Windows 95, Windows NT, X (a popular UNIX windowing system), the MacOS, and equivalent graphical operating systems. These are often referred to as tree viewers, examples of which include the Windows Explorer (see FIG. 1), the Macintosh Finder (see FIG. 2), and variants such as the NeXTSTEP Browser widget.

These viewers help to reduce data complexity by structuring data hierarchically and allowing the user to choose which portion of the data set is visible through a set of expand/collapse controls. This approach works well if the data to be viewed is inherently hierarchical and if the tree is not too broad, i.e. each parent node has a small number of children.

Unfortunately, many of the large information spaces encountered in today's networked information world are very broad in this tree sense. For example, consider the message store for the Netscape Messaging Server 4.0. FIG. 3 shows a completely collapsed tree, showing no subdirectories. The contents are displayed in a small, compact area, but the appearance is deceiving. In arbitrarily large data sets, e.g. where one folder may contain twelve subentries and where another folder might have hundreds or thousands of entries, a single click to expand a folder can suddenly expose screens and screens worth of information.

In the example shown on FIG. 3, clicking to expand the Message Store 30 directory exposes a listing of hundreds of subdirectories, listed alphabetically (see FIG. 4). The list shown on FIG. 4 is so long that a user must scroll dozens of times over to get to the entry for which she is looking. Even type-ahead selection is only of limited value, i.e. with hundreds or thousands of entries, typing the letters "sm" may jump to the first entry for Smith in a list containing one-hundred Smiths.

Note that the top-level directories, Logs 32 and Alarms 34, which were visible when the tree was collapsed (FIG. 3), are now no longer visible (FIG. 4). To reach either or these directories, the user must collapse the entire tree again, thereby making it impossible to drag-and-drop contents from the expanded tree to another top-level directory, or the user must scroll, once again, past countless screens of subentries.

One common solution to this problem is to switch to a search-based graphical user interface, such as the Find Command on the Macintosh or the Find Files and Folders Command in Windows. This allows the user to choose a smaller set of objects to view, but has the disadvantage that it removes the hierarchical structural context in which the data actually resides. What would be more desirable is to allow the user to take advantage of the benefits of both worlds. That is, by combining the best attributes of searching and hierarchical.

Another known solution to the problem of hierarchically browsing through a large database is to provide a single global filter which applies to the entire tree to weed out unwanted nodes. While this solution cuts down on the amount of visible information, it limits the user to a single global filter, which may impact levels of the tree that the user did not want filtered. It also does not allow for multiple different filters on different portions of the tree.

What is needed is some mechanism for limiting the display of entries within a tree view, so that arbitrarily large directories, i.e. directories containing multiple subdirectories or entries, may be easily filtered and visually navigated.

SUMMARY OF THE INVENTION

The invention provides a common interface solution to the problem of burgeoning information sets, referred to as inline tree filters, which structures the represented data in a hierarchical tree. Inline filters are information-filtration devices that are applied to a traditional interface element, such as a hierarchical tree viewer. The invention provides a technique that enables the user to choose selectively the data that they want to display, while not otherwise altering the behavior and interaction of the tree viewer itself. Inline tree filters are suitable for any graphical user interface that could potentially use a tree viewer.

DETAILED DESCRIPTION OF THE INVENTION

The invention provides a common interface solution to the problem of burgeoning information sets, referred to as inline tree filters, which structures the represented data in a hierarchical tree. Inline filters are information-filtration devices that are applied to a traditional interface element, such as a hierarchical tree viewer. The invention provides a technique that enables the user to choose selectively the data that they want to display, while not otherwise altering the behavior and interaction of the tree viewer itself. Inline tree filters are suitable for any graphical user interface that could potentially use a tree viewer. With an inline filter, the user can embed one or more filters directly into any portion of a graphical tree viewer, allowing a selective set of objects to be affected by the filter.

Figure 1:
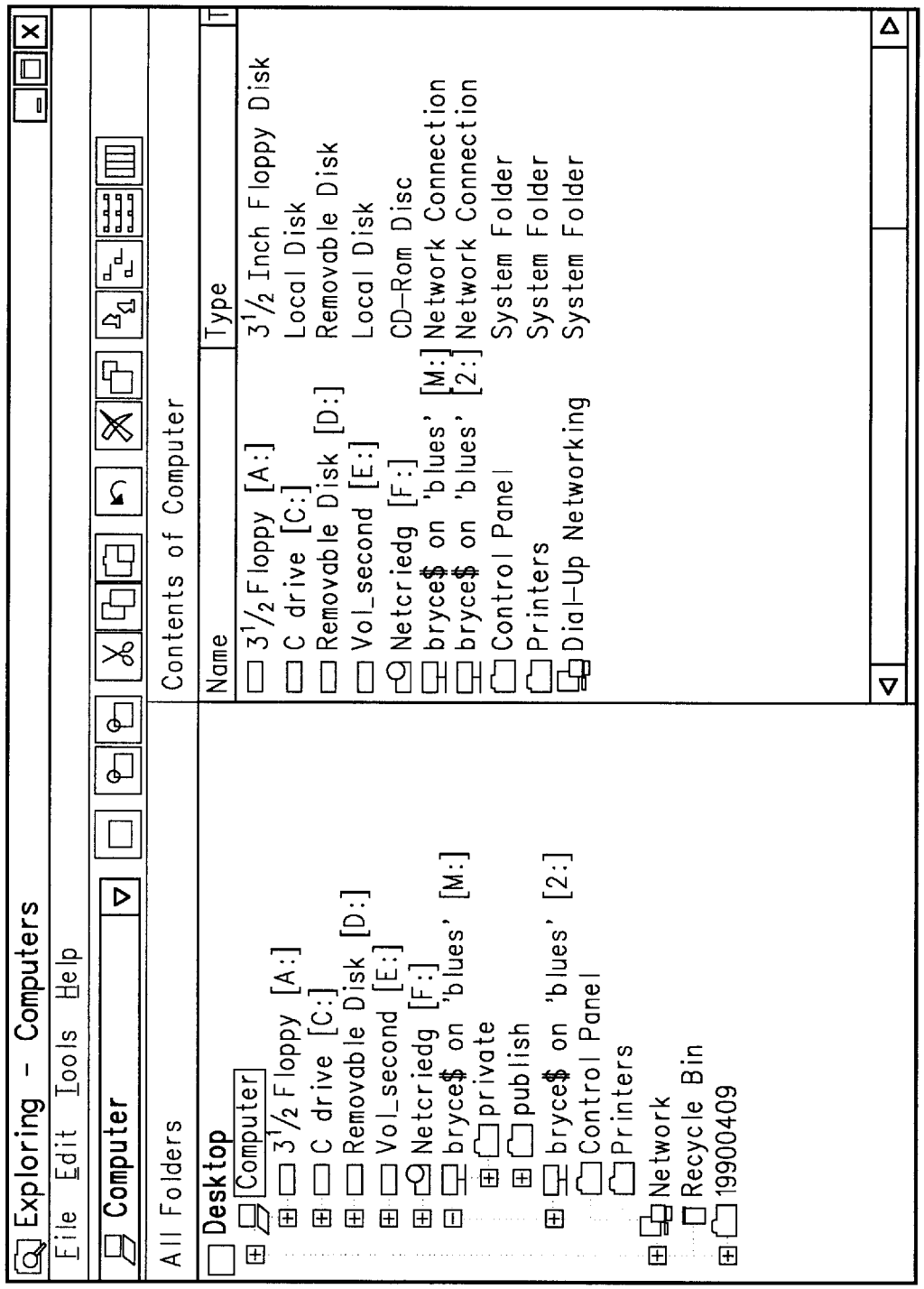
FIG. 1 is a graphic representation of a hierarchical tree used in Windows Explorer.
Figure 2:
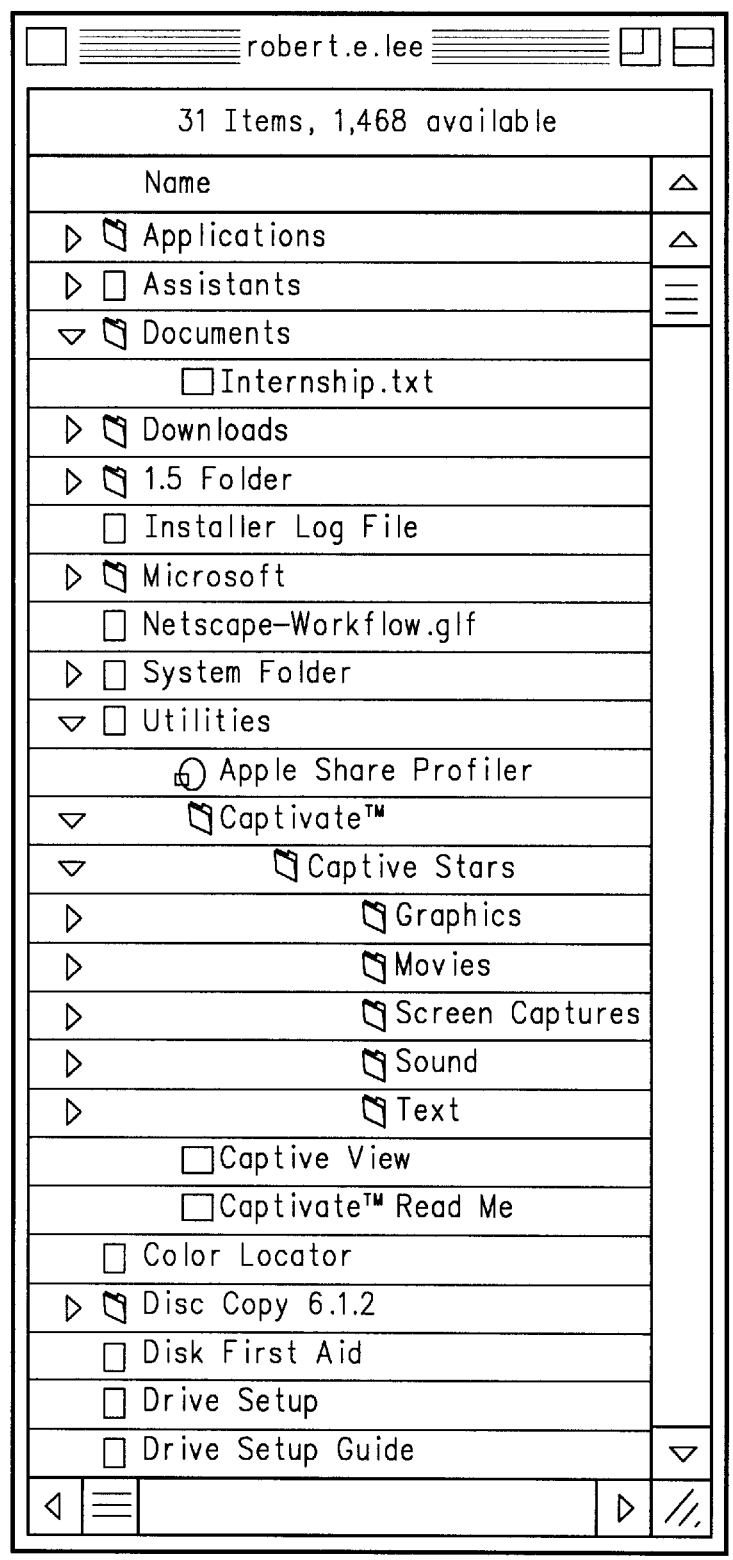
FIG. 2 is a graphic representation of a hierarchical tree used in the Mac OS.
Figure 3:
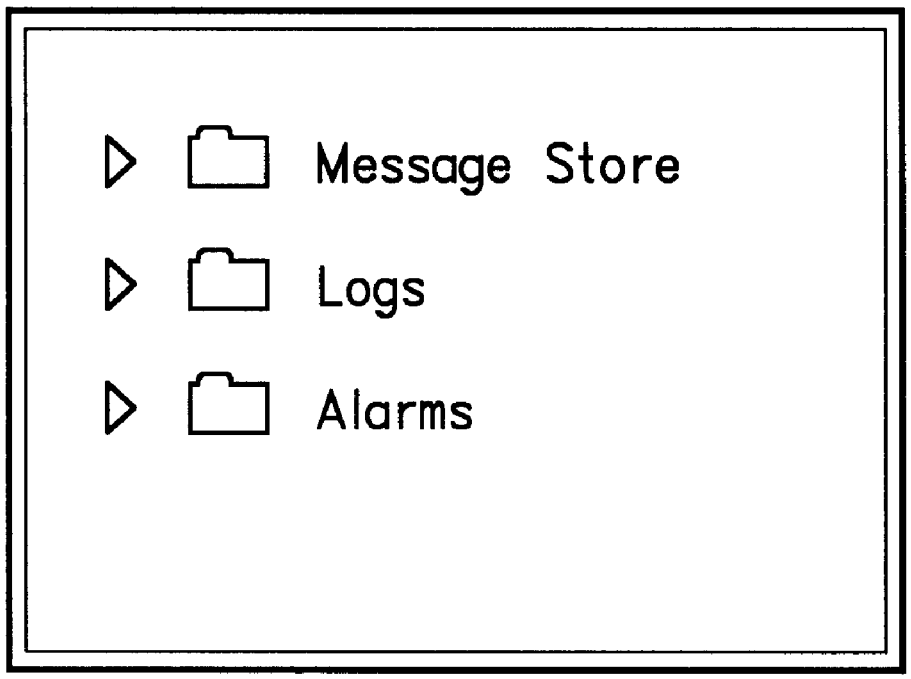
FIG. 3 is a graphic representation of a collapsed hierarchical tree used in Netscape Message Server 4.0.
Figure 4:
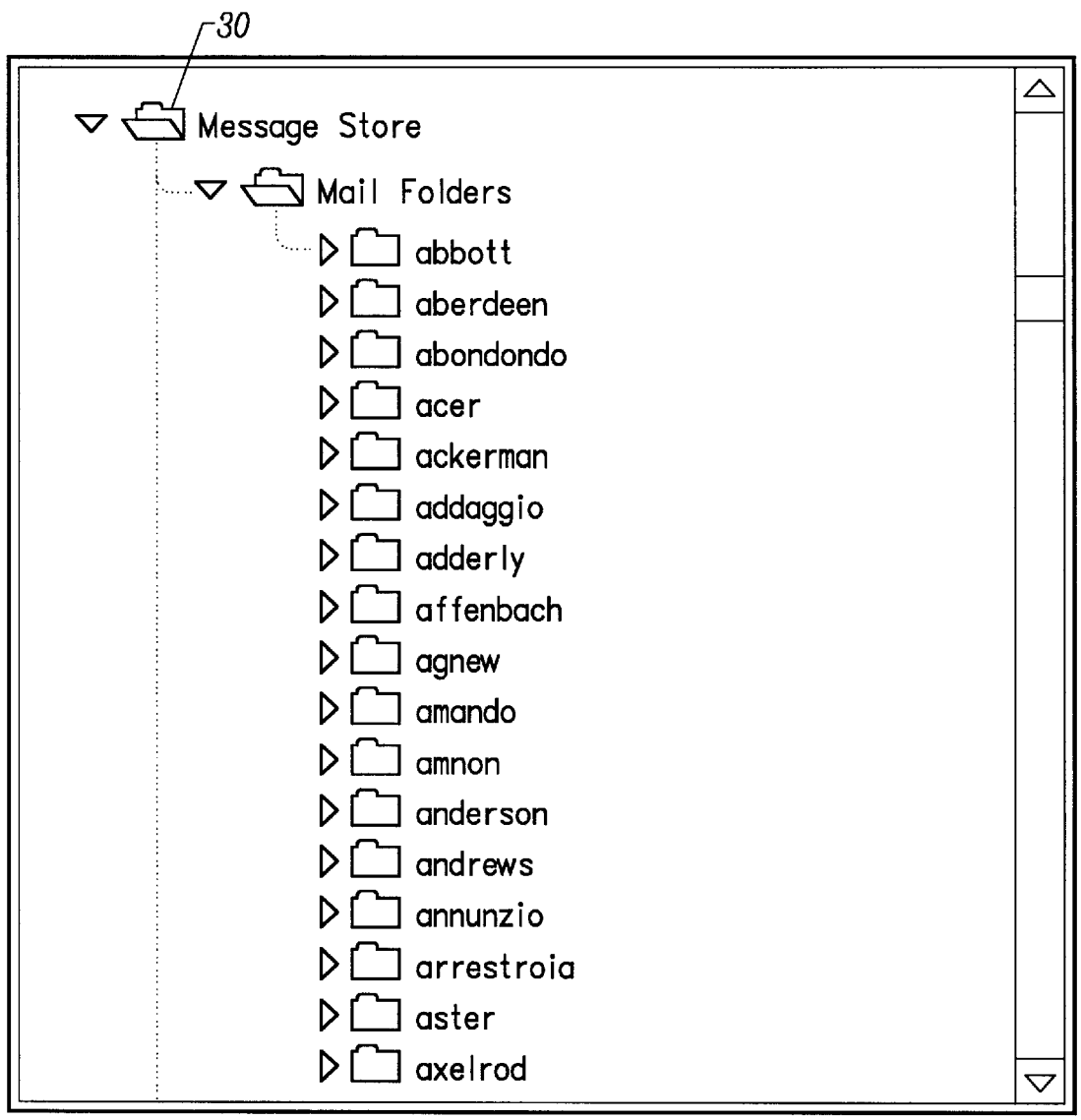
FIG. 4 is a graphic representation of an expanded hierarchical tree used in Netscape Message Server 4.0.
Figure 5:
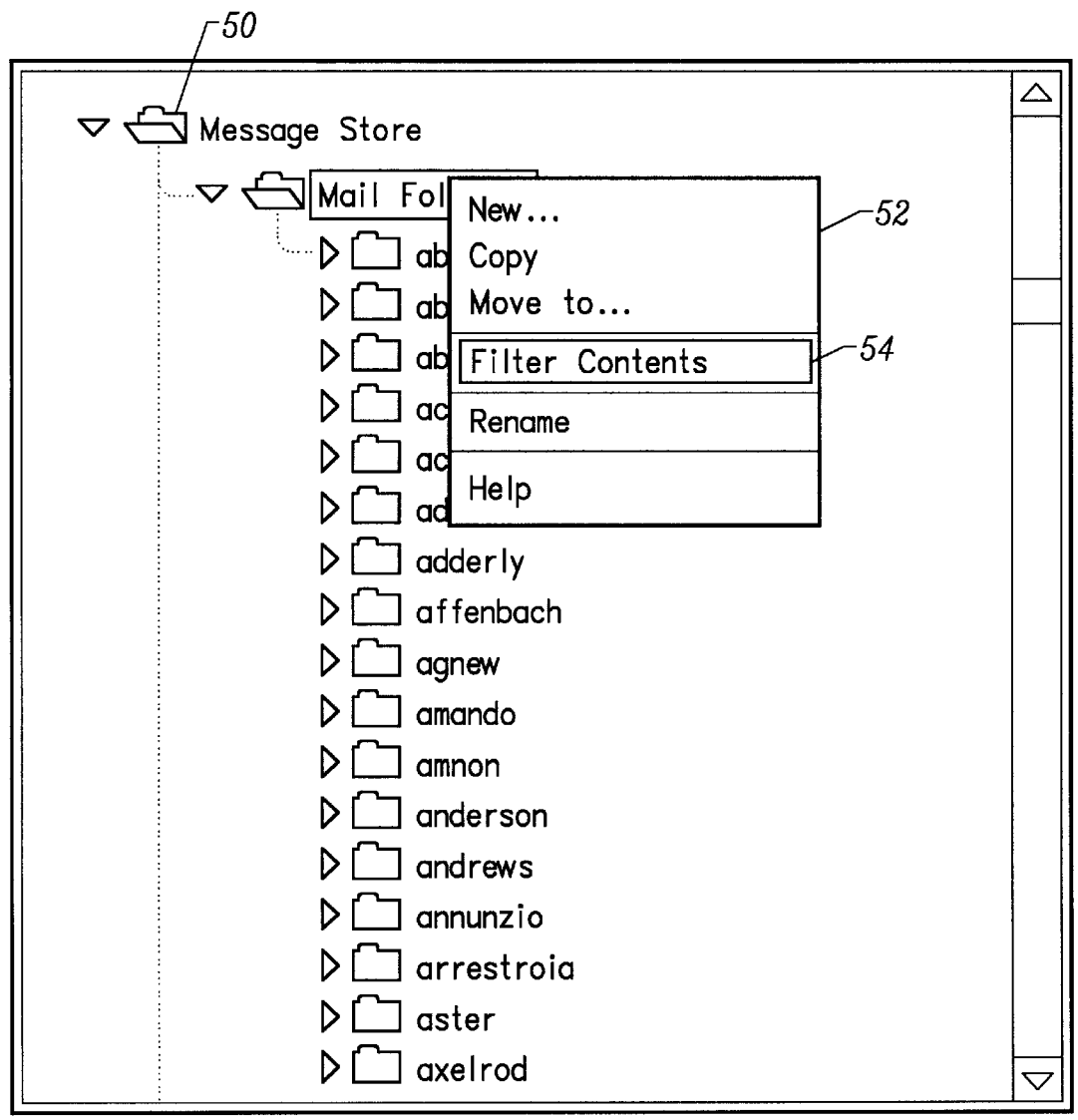
FIG. 5 is a graphical representation of an inline tree filter command in a pop-up menu according to the invention.

FIG. 5 is a graphical representation of an inline tree filter command in a pop-up menu according to the invention. In FIG. 5, a user wants to view a directory in the Mail Folders 50 entitled Maddux. Rather than scroll through all 1,200 entries in this folder, she instead right-clicks on the folder. From a pop-up menu 52, she selects Filter Contents 54 to insert an inline tree filter.

Figure 6:
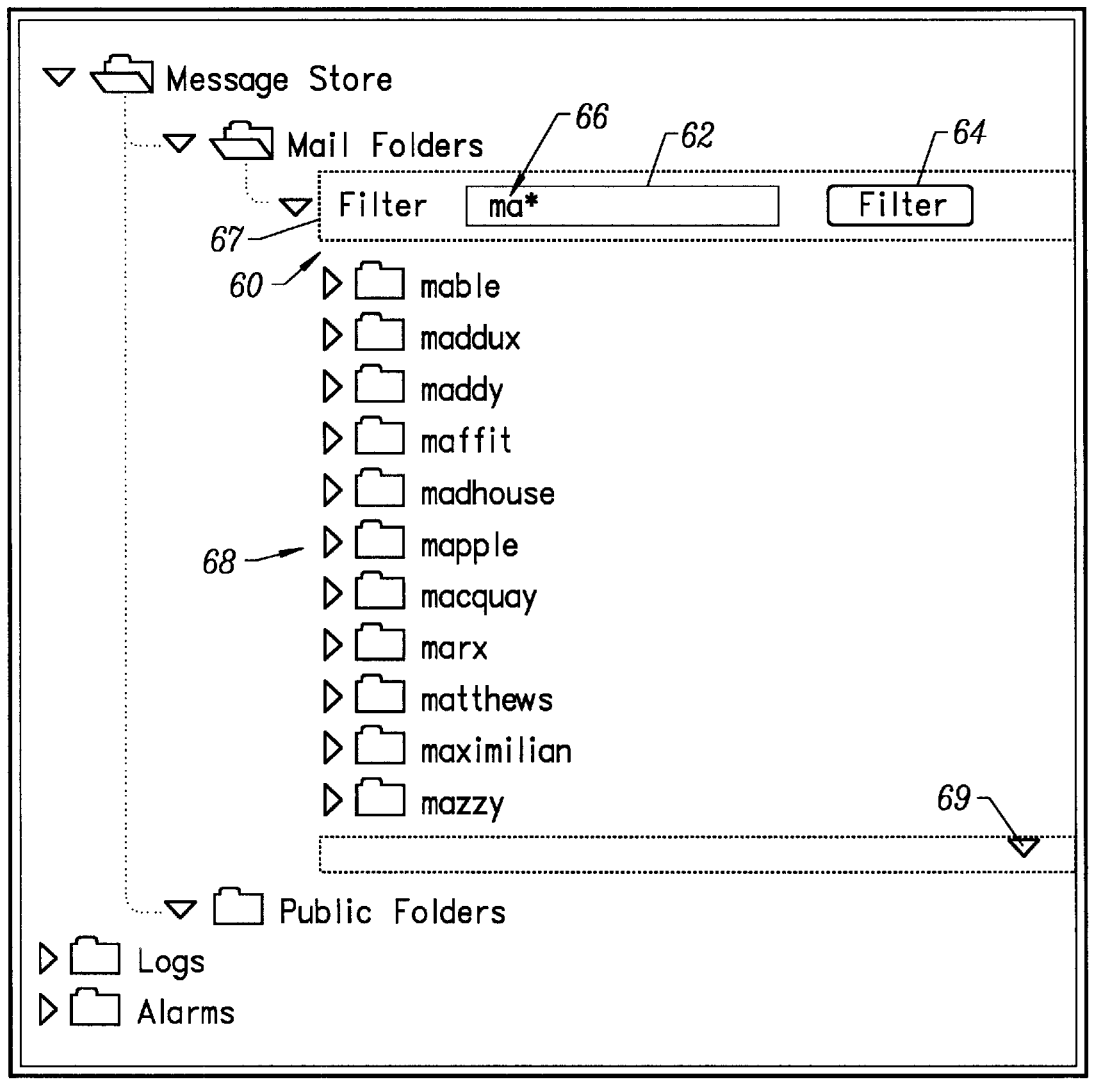
FIG. 6 is a graphical representation of an inline tree filter search mechanism according to the invention.

FIG. 6 is a graphical representation of an inline tree filter search mechanism according to the invention. The inline tree filter 60 is a simple search-like mechanism that is embedded within the tree widget itself. It provides a type-in text field 62 and a button 64 to perform the filter. Moving within the found set of entries is provided by Up and Down arrows 67, 69 that are a part of the filter mechanism itself.

As shown in FIG. 6, the user typed "ma*" 66 to retrieve all records containing the text "ma." The folders 68 that are displayed within the filter behave the same as any unfiltered directories. Thus, they can be expanded, closed, copied, dragged, or deleted.

Inline filters are useful in a wide rage of existing situations, and have broad applicability. For example:

Applies across different look and feels. Inline filters can be applied to any of the existing tree widget look and feels, such as the tree widgets of the Macintosh Finder, Windows 98/NT File Explorer.

Applies across any type of tree node. Inline filters are also independent of the type of data that appears in the tree. In the example shown in FIG. 6, a tree containing folders rendered with the Netscape look and feel tree widget is depicted. Objects other than folders, such as mail messages, files, and applications, can be filtered as well. These various object types can be heterogeneously represented in the tree. That is, a tree to be filtered may contain any number of different object types.

Applies across any arbitrary filter criteria. Tree nodes often contain multiple attributes or properties, such as name, modification date, content, and author. As with other search or filter-based filtering or retrieval methods, one or more of these attributes may be used to filter, and any form of regular expression may be used as well. The full power of searching is brought to bear on the portion of the tree the user wants to filter.

Multiple filters per tree. An arbitrary number of filters may be inserted into the tree. The invention does not limit the tree to one filter.

Nested filters. Filters may also be placed inside of each other to allow multiple nesting at different levels of the tree.

Alternate interactions for selecting nodes and creating filters are possible. The preferred method of creating an inline tree is to navigate to select an object in the tree and to then use a pop-up menu off of a tree node, but many alternate interactions for filter instantiation are possible. All that is required is that the interaction specify a node and the filter action. Any number of different interaction techniques can be used to either specify the tree node, and/or the creation of the filter.

For filter creation, these interactions include, but are not limited to, a keyboard accelerator (such as cmd-fl), a menu command (such as view->create filter), a voice command (such as, computer insert filter), or a gesture (such as an up down motion with the pointer or input device).

On the tree node selection side, interactions include, but are not limited to, keyboard navigation to the node, selection of the node with a pointer, or dragging a representation of a filter onto a node (known as a drag and drop).

The following are a few examples that illustrate the broad scope of the invention:

EXAMPLE 1

Figure 7:
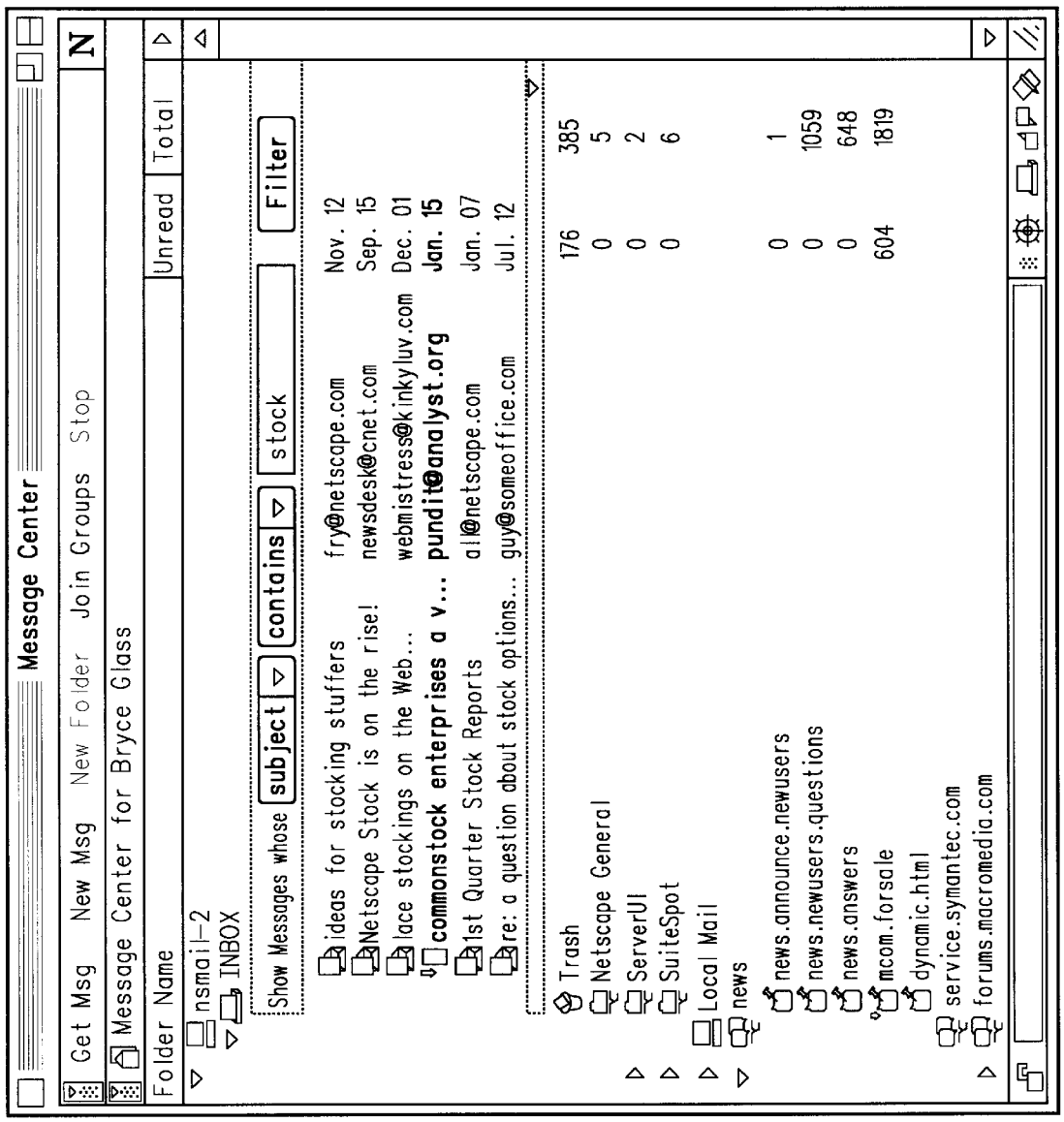
FIG. 7 is a graphical representation of an inline tree filter mechanism containing multiple heterogeneous object types, filter attributes, and the relationship between the attribute and an attribute value according to the invention.

FIG. 7 is a graphical representation of an inline tree filter mechanism containing multiple heterogeneous object types, filter attributes, and the relationship between the attribute and an attribute value according to the invention. In the example shown in FIG. 7, there is a tree that uses the Macintosh tree widget and that contains multiple heterogeneous object types, e.g. mail folders, mail messages, news servers, and newsgroup messages. This filter also employs a more complex filtering mechanism. The user may choose which attribute to filter against (e.g. subject, author, and date), and also the relationship between the attribute and the value (e.g. contains, doesn't contain, is, is not, and sounds like).

EXAMPLE 2

Figure 8:
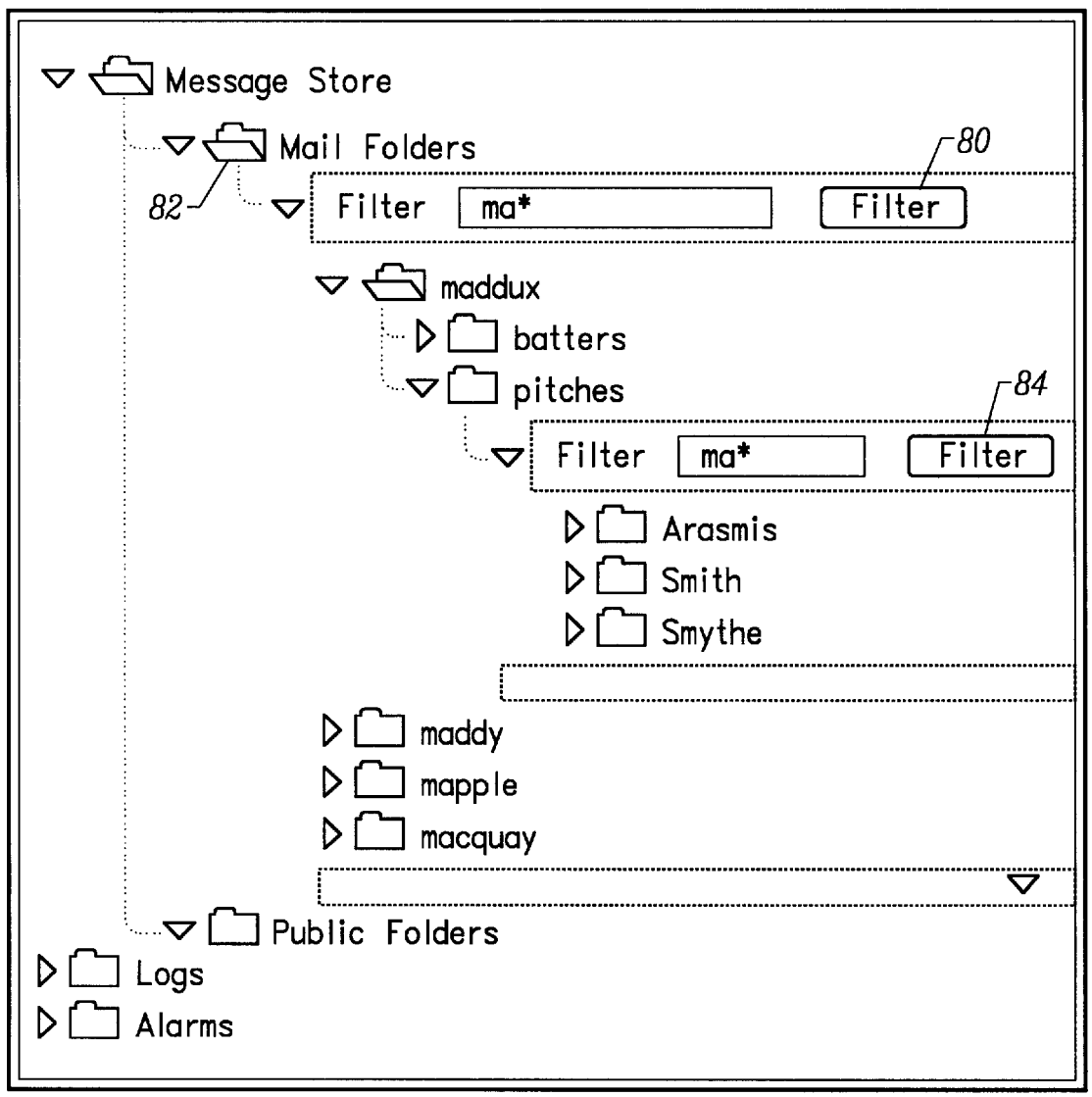
FIG. 8 is a graphical representation of an inline tree filter showing multiple filters, including filters that are embedded within other filters, according to the invention.

FIG. 8 is a graphical representation of an inline tree filter showing multiple filters, including filters that are embedded within other filters, according to the invention. The example of FIG. 8 shows how multiple filters can be applied to a tree at once, including embedding filters inside other filters. In this example a filter 80 is applied to the Mail Folders 82 portion of the tree, and in addition, the filters subfolder has a different filter 84 applied.

Implementation

There are many methods of implementation for inline tree filters. A simple implementation is explained below (refer to FIGS. 5–8 for an understanding of the following discussion, which sets forth a system that is similar to, but not identical to the system of FIGS. 5–8):

In this example, four nodes (or branches) can be expanded, e.g. Users, Folders, Logs, and Alarms. There are at least 500 entries on the Users branch, making it difficult to manipulate this branch in a useful manner without a lot of scrolling. By default, the Users branch is set to filter, although right-clicking the mouse button on the Users node displays a pop-up menu which allows the user to enable or disable filtering.

For most tree components, there exists a function or method that draws the children (or leaves) of a particular branch. For the inline tree filter example, this function determines whether filtering is enabled or disabled for that particular node. If filtering is enabled, the node has an instance of its own filter panel, which in this example showing the following. The text field and the Filter button are made visible, and the 500 child nodes (the names of the users) are hidden from view.

Whenever the user presses the Filter button, the filter panel checks to see what the user has entered into the text field, and then traverses through the list of 500 users, showing those that match the criteria entered, and hiding any others. The filter panel itself is an object (or class) that contains all of the intelligence for the filtering and matching. The filter panel is attached to a node (in this case the Users node), which allows it to show and hide the children of that node.

In a more complex example, the filter panel actually adds or removes children from a tree node (instead of just showing and hiding them), based on the search criteria. This feature is useful, for example, over a slow network connection, where downloading the names of 500 users is an unnecessary waste of time. Instead, the filter panel dynamically generates the contents of the tree by replacing the children with only those that matched the criteria.

In general, the basic components of the preferred embodiment of the invention consist of, but are not limited to:

Attaching a unique filter panel to a tree node (the parent node);

Allowing the filter panel to manipulate the list of child nodes beneath the parent node;

A filter method (or query) that is executed by the filter panel to get the appropriate list of children that should be made visible; and Enabling and disabling the filtering capability for parent nodes that support filtering.

Building hierarchical or nested filters is relatively straightforward because tree components themselves are hierarchical and the filtering extension does nothing to break this model. Because the primary anomaly is that some nodes may need to be drawn with an additional filter panel beneath them, there are minimal changes in the tree's structure from how a typical tree component works.

The following tables and accompanying discussion set forth various modules that comprise an actual implementation of the invention.

module FilterPanel.java

This module (see Table 1) defines the class FilterPanel, an extension of the standard Java Swingset toolkit's panel class. The FilterPanel class defines the custom user interface control that allow the user to define and input the filter criteria.

In this case, FilterPanel is defined to contain a static text string as a label, a text entry field for entering the filter criteria, and a button labeled Filter to input the filter criteria to the system. When the Filter button is pressed, the class calls the method handleEvent, which in turn calls the method doFilter, which applies the filter criteria to the nodes in the tree, returning the newly filtered set of nodes to Filterable-Tree to be redrawn.

TABLE 1

FilterPanel.java

```
import java.awt.*;
public class FilterPanel extends Panel
{
    FilterableTreeNode branch;
    boolean firstTime;
    int height;
    Label label;
    TextField textField;
    Button button;
    public FilterPanel(FilterableTreeNode branch)
    {
        this.branch = branch;
        this.firstTime = true;
        setLayout(new FlowLayout(9));
        setFont(new Font("PrimaSans", Font.PLAIN, 11));
        add(label = new Label("Show items containing:",
Label.LEFT));
        add(textField = new TextField(8));
        add(button = new Button("Filter"));
        setBackground(new Color(229, 229, 229));
    }
    public void paint(Graphics g)
    {
        if (firstTime) {
```

TABLE 1-continued

FilterPanel.java

```
            doLayout( );
            height = preferredSize( ).height;
//System.err.println("filterPanel height is " +height);
        }
    }
    public boolean handleEvent(Event event)
    {
        if ((event.id == Event.ACTION_EVENT) &&
            (event.target == button)) {
                doFilter(textField.getText( ));
                return true;.
        }
        return super.handleEvent(event);
    }
    public void doFilter(String what)
    {
        for (int i = 0; i~branch.childcount; i++) {
            FilterableTreeNode child = branch.children[i];
            if (child.text.indexOf(what) != −1) {
                child.setShowing(true);
            } else {
                child.setShowing(false);
            }
        }
        branch.setChanged( );
    }
}
```

FilterableTreeNode

This module (see Table 2) defines the class FilterableTreeNode, an extension of the standard Java Swingset toolkit's panel class. It in effect defines a new tree widget, much like the tree widget defined as a standard part of the swingset toolkit, but with the specialized filtering functionality and a custom look and feel that mimics that used in Netscape server products. It defines the visual look of each node in the tree, as well as the look of the control for expanding and collapsing controls.

Specifically, the class initially does setup work to load custom icons for the expand/collapse controls, open and closed folder (or subtree) nodes, and leaf nodes. It also loads two images that are composited together to make up the lines that visually connect the tree together. It then defines the colors for the tree background, node text, and selected versions thereof. It then defines the a geometry or layout of the tree.

The second part of the class definition defines the structure of the tree and keeps track of each node and who its parents are. Note that all the functionality defined so far is standard for any tree node or tree class.

The filter-specific functionality is defined in the methods setFiltering, setFilterPanelVisibility, and setChanged.

setFiltering is a boolean value that keeps track of whether a particular node wishes to be filtered.

setFilterPanelVisibility checks to see if a node is expanded and filtering. If so, then the panel (defined in FilterPanel.java) should be visible in the tree. This function is called recursively so that child nodes with filters have their panels hidden as well.

setchanged is a method that causes the tree to be redrawn after filter criteria have been input via the FilterPanel class. It then calls an update function to redraw the tree to reflect the new filtered contents.

The third and last part of the class definition contains standard methods to actually draw each part of the tree, such as icons, expand collapse controls and other graphic elements on screen.

TABLE 2

FilterableTreeNode

```
import java.awt.*;.
import java.util.*;
import java.applet.Applet;
// what the world needs now
// is a-nother tree widget
// like i need
// a hole in the head
//
// - cracker
public class FilterableTreeNode extends Panel
{
    // what the +/- look like
    static Image expanderImage;
    static Image collapserImage;
    // opened and closed folder icons
    static Image expandedImage;
    static Image collapsedImage;
    // icon for an item in the tree
    static Image leafImage;
    // images for the curved and straight pieces
    static Image hookImage;
    static Image hookLineImage;
    // load all images for the various parts of the tree
    static void loadImages(Applet applet)
    {
        MediaTracker tracker = new MediaTracker(new Frame( ));
        expanderImage = loadImage("tree- expander.gif", applet);
    tracker.addImage(expanderImage, O);
        collapserImage = loadImage("tree-collapser.gif", applet);
        tracker.addImage(collapserImage, O);
        expandedImage = loadImage("folder-open.gif", applet);
        tracker.addImage(expandedImage, O);
        collapsedImage = loadImage("folder-closed.gif", applet);
        tracker.addImage(collapsedImage, O);
        leafImage = loadImage("document.gif", applet);
        tracker.addImage(leafImage, O);
        hookImage = loadImage("hook.gif", applet);
        tracker.addImage(hookImage, O);
        hookLineImage = loadImage("hook-line.gif", applet);
        tracker.addImage(hookLineImage, O);
        try {
            tracker.waitForAll( );
        } catch (InterruptedException e) {
            e.printStackTrace ( );
        }
    }
    static Image loadImage(String filename, Applet applet)
    {
        if (apples == null) {
            return Toolkit.getDefaultToolkit( ).getImage("images/"}
+ filename);
        } else {
            return applet.getImage(applet.getCodeBase( ), "images/"
+ filename);
        }
    }
    // coloring for the hash marks on the tree
    static final Color hashColor = new Color(153, 153, 153);
    static final Color hashLighterColor = new Color(204, 204, 204);
    // colors for the background, text, and selected versions thereof
    static final Color backgroundColor = Color.white;
    static final Color textColor = Color.black;
    static final Color backgroundColorSelected = new Color(204, 204,
255);
    static final Color textColorSelected = Color.black;
    // height of each row, indent for each subtree
    static final int ROW_HEIGHT = 18; static final int INDENT_WIDTH = 26;
    // the +/- symbols
    static final int TRIGGER_DIMENSION = 7;
    static final int TRIGGER_TOP = 7; static final int TRIGGER_LEFT = 1;
    // icons for the objects
    static final int ICON_DIMENSION = 16;
    static final int ICON_TOP = 1; static final int ICON_LEFT = 9;
    // the rope thingy that extends from beneath the node
    static final int VINE_LEFT = ICON_LEFT + ICON_DIMENSION / 2;
    // rect for a selected node
    static final int SELECTION_TOP = 2;
```

TABLE 2-continued

FilterableTreeNode

```
    static final int SELECTION_HEIGHT = 15;
    static final int SELECTION_LEFT = 24;
    static final int SELECTION WIDTH EXTRA = 3;
    // font sizing information
    static final int TEXT_LEFT = 28;
    static int fontAscent; static int fontHeight;
    static Font font; static FontMetrics fontMetrics;
    static int textBaseline;
    static {
        font = new Font("PrimaSans", Font.PLAIN, 11);
        fontMetrics =
Toolkit.getDefaultToolkit( ).getFontMetrics(font);
        fontAscent = fontMetrics.getAscent( );
        fontHeight = fontAscent + fontMetrics.getDescent( );
        textBaseline = ((ROW_HEIGHT - fontHeight + 1)/2) +
fontAscent:
    }
    // information for this subtree
    String text;            // text for the item in the tree
    boolean expanded;
    boolean leaf;           // independent of whether
childCount == 0
    boolean selected;
    boolean showing;        // 'visible' is used by Component
    FilterPanel filterPanel;    // filterable = (filterPanel !=
null)
    boolean filtering;
    //ins filterPanelHeight;
    FilterableTreeNode mom;
    int childCount;
    FilterableTreeNode children[ ];
    int xoffset;
    int yoffset;
    int height;
    public FilterableTreeNode(String text)
    {
        this(text, null, null);
    }
    public FilterableTreeNode(String text, FilterableTreeNode mom)
    {
        this(text, mom, null);
    }
    public FilterableTreeNode(String text, FilterableTreeNode mom,
                FilterPanel filterPanel)
    {
        if (leafImage == null) {
            loadImages(null );
        }
        this.text = text;
        this.expanded = false;
        this.leaf = true;
        this.filterPanel = filterPanel;
        this.filtering = false;
        this.mom = mom;
        this.childCount = 0;
        this.children = null;
        this.selected = false;
        this.showing = true;
    }
    public void setText(String text)
                    [
        this.text = text;
    }
    public void setExpanded(boolean expanded)
    {
        this.expanded = expanded;
        setFilterPanelVisibility(expanded);
    }
    // if a node is expanded and filtering, then the panel should be
    // visible. this function is called recursively so that child
    // nodes with filters have their panels hidden as well.
    public void setFilterPanelVisibility(boolean state)
    {
        if (filterPanel != null) {
            //System.err.println(((state & filtering) ? "showing"
:"hiding ") + this);
            filterPanel.setVisible(state & expanded & filtering);
```

TABLE 2-continued

FilterableTreeNode

```
        }
        // setFilterPanelVisibility is a separate function because of
        // what's seen below -- need to collapse the child filters, even
        // though the children retain their expanded/collapsed state
        for (int i = 0; i c childCount; i++) {
            children[i].setFilterPanelVisibility(state & expanded);
        }
    }
    public void toggleExpanded( )
    {
        setExpanded(!expanded);
    }
    public void setLeaf(boolean leaf)
    {
        this.leaf = leaf;
    }
    public void setFilterPanel(FilterPanel filterPanel)
    {
        this.filterPanel = filterPanel;
    }
    public void setFiltering(boolean filtering)
    {
        this.filtering = filtering;
        //filterPanel.setVisible(filter ing);
        setFilterPanelVisibility(filter ing);
        // if filtering, hide everybody, if not
        // filtering, show everybody.
        for (int i = 0; i c childCount; i++) {
            children[i].showing = !filtering;
        }
        // don't draw if we're just out of the gate . . .
        if (mom != null) {
            setChanged( );
        }
    }
    public boolean isFilterable( )
    {
        return (filterPanel != null);
    }
    public void setParent(FilterableTreeNode mom)
    {
        this.mom = mom;
    }
    public void addChild(String childText)
    {
        prepareChildren( );
        children[childCount++] = new FilterableTreeNode(childText, this);
        this.leaf = false;
    }
    public void addChild(FilterableTreeNode child)
    {
        prepareChildren( );
        children[childCount++] = child;
        child.setParent(this);
        this.leaf = false;
        if (child.filterPanel != null) {
            findRoot( ).add(child.filterPa nel);
        }
    }
    public void addFilterChild(String childText, FilterPanel childPanel)
    }
        prepareChildren( );
        children[childCount++] = new FilterableTreeNode(childText this, childPanel);
        this.leaf = false;
        // not visible by default, and node was just made above
        findRoot( ).add(childPanel);
    }
    private void prepareChildren( )
    {
        if (children == null) {
            children = new FilterableTreeNode[10];
```

TABLE 2-continued

FilterableTreeNode

```
            return;
        }
        if (children.length != childCount)
            return;
        FilterableTreeNode[ ] temp = new
FilterableTreeNode[childCount*2];
        System.arraycopy(children, 0, temp, 0, childCount);
        children = temp;
    }
    public FilterableTree findRoot( )
    {
        return mom.findRoot( );
    }
    public void setSelected(boolean selected)
        this.selected = selected;
    }
    public void setShowing(boolean showing)
    {
        this.showing = showing;
    }
    // called by the FilterPanel
    public void setChanged( )
    {
        mom.setChanged( );
    }
    public void update( )
    {
        mom.update( );
    }
    public void paintVisibleFilterPanels(Graphics g)
    {
        if (filtering & expanded) {
            //filterPanel.paintComponent s(g);
            filterPanel.invalidate( );
        }
        for (int i = 0; i < childCount; i++) {
            children[i].paintVisibleFilterPane Is(g);
        }
    }
    public void calcDimension(Dimension dim, int left)
    {
        dim. height += ROW_HEIGHT;
        dim.width = Math.max(dim.width, left + TEXT_LEFT +
fontMetrics.stringWidth(text));
        if (expanded) {
            if (filtering) {
                Dimension fpd = filterPanel.getPreferredSize( );
                dim.height += fpd.height;
                dim.width = Math.max(dim.width, left + ICON_LEFT
+ fpd.width);
            }
            for (int i = 0; i < childCount; i++) {
                if (children[i].showing) {
                    children[i].calcDimension(dim, left +
INDENT_WIDTH);
                }
            }
        }
    }
    public int paint (Graphics g, int x, int y)
    {
        xoffset = x;
        yoffset = y;
        // draw this node
        if (leaf) {
            g.drawImage(leafImage, x + ICON_LEFT, y + ICON_TOP,
null);
        } else {
            g.drawImage(expanded ? collapserImage : expanderImage,
                    x + TRIGGER_LEFT, y + TRIGGER_TOP, null);
            g.drawImage(expanded ? expandedImage : collapsedImage,
                    x + ICON_LEFT, y + ICON_TOP, null);
        }
        if (selected) {
            g.setColor(backgroundColorSelected);
            g.fillRect(x + TEXT_LEFT, y + SELECTION_TOP,
                    fontMetrics.stringWidth(text) +
```

TABLE 2-continued

FilterableTreeNode

```
SELECTION_WIDTH_EXTRA,
                SELECTION_HEIGHT);
        g.setColor(textColorSelected);
    } else {
        g.setColor(textColor);
    }
    g.drawstring(text, x + TEXT_LEFT, y + textBaseline);
    y += ROW_HEIGHT;
    // draw filter (if visible)
    if (filtering) {
        if (expanded) {
            filterPanel.move(x + ICON_LEFT, y);
            fitterPanel.resize(filterPanel.preferredSize( ));
            filterPanel.setVisible(true);
            y += filterPanel.preferredSize( ).height;
        } else {
            filterPanel.setVisible(false);
        }
    }
    // draw children and lines
    if (expanded) {
        int lastVisibleChild = childCount − 1
        while (!children[lastVisibleChild].showing) {
                lastVisibleChild--;
                if (lastVisibleChild == −1)
                break;
        }
        if (lastVisibleChild != −1) {
            for (int i = 0; i <childCount; i++) {
                if (!children[i].showing)
                    continue;
                If (i == lastVisibleChild) {
                    g.drawImage(hookImage, x +
VINE_LEFT y, null);
                } else {
                    g.drawImage(hookLineImage, x +
VINE_LEFT y, null);
                }
                int yextra = children[i].paint(g x +
INDENT_WIDTH, y);
                if ((yextra ~ ROW_HEIGHT) && (i !=
childCount-I)) {
                    //System.err.println(yextra);
                    drawDottedLine(g, x + VINE_LEFT, y +
ROW_HEIGHT, yextra - ROW_HEIGHT);
                }
                y += yextra;
            }
        }
    }
    // for mouse event handling
    height = y - yoffset;
    return height;
}
// slow! gak.
private void drawDottedLine(Graphics g, int x, int y, int count)
{
    g.setColor(hashColor);
    int y2 = y + count − 1;
    while (y < y2) {
        g.drawLine(x, y, x, y);
        y += 2;
    }
    // if it's an odd number of pixels, draw the last pixel
    // in a lighter color, so that the dotted lines don't
    // appear to be muddy or broken-looking. this is easier
    // that trying to set all panel and sub-component sizes
    // to an even number.
    if ((count % 2) == 1) {
        g.setColor(hashLighterColor);
        g.drawLine(x, y, x, y);
    }
}
public FilterableTreeNode findRow(int y)
{
    //y −= yoffset;
    //System.err.println("y, yoffset, height =" "+ y +",
```

TABLE 2-continued

FilterableTreeNode

```
            yoffset +"," + height);
        // these first two could be made more efficient
        // by combining the y <> yoffsetLast stuff
        if ((y > yoffset) && (y ~ yoffset + ROW_HEIGHT))
            return this;
        // don't check children if y ! [yoffsetLast, heightLast]
        if ((y < yoffset) || (y > yoffset + height)) {
            return null;
        }
        for (int i = 0; i <childCount; i++) {
            FilterableTreeNode which = children[i].findRow(y);
            if (which != null) {
                return which;
            }
        }
        return null:
    }
    public String toString( )
    {
        return text:
    }
}
```

FilterableTree.java

This module (see Table 3) defines the class FilterableTree, an extension of the FilterableTreeNode class defined in the first module. A FilterableTree is just a special FilterableTreeNode (the top or root node of a tree) with special handlers for drawing the scrolibar and actual contents of the tree.

TABLE 3

FilterableTree.java

```
import java.awt.*;
import java.awt.event.*;
import iava.util.*;
// extends FilterableTreeNode because it's actually a
// node itself (the root node) but adds the handlers for
// the scrollbar and the actual contents of the panel
// i wish that FilterableTreeNode didn't have to be a
// panel, only this class needs to be a panel, but
// java doesn't allow for multiple inheritance. oh well.
public class FilterableTree extends FilterableTreeNode
implements ItemListener, ActionListener
{
    // used for double-buffering the image to the screen
    Image offscreen;
    // size of the actual tree being shown currently
    Dimension dimension;
    // flags to wipe out the offscreen buffer and re-draw
    boolean changed;
    // currently selected items
    Vector selections = new Vector( );
    // popup so that user can turn filtering on and off
    PopupMenu popup;
    CheckboxMenuItem filterOn;
    CheckboxMenuItem filterOff;
    FilterableTreeNode popupRow;          // last seen at . . .
    public FilterableTree(String text)
    {
        super(text);
        setup( );
    }
    public FilterableTree(String text, FilterPanel filterPanel)
    {
    super(text, null, filterPanel);
        setup( );
    }
protected void setup( )
    {
```

TABLE 3-continued

FilterableTree.java

```
        //setBackground(Color.whi te);
        // layout has to be null because the filterPanels
        // get moved around to explicit coordinates
        setLayout(null);
        //addMouseListener(this);
        popup = new PopupMenu( );
        popup.add(filterOn = new CheckboxMenuItem("Filtering On"));
        filterOn.addItemListener(this);
        popup.add(filterOff = new CheckboxMenuItem("Filtering Off"));
        filterOff.add ItemListener(t his);
        this.add(popup);
        popup.addActionListener(th is);
        enableEvents(AWTEvent.MOUSE_EVENT_MASK |
AWTEvent.KEY EVENT MASK);
    }
    public FilterableTree findRoot( )
    {
        return this;
    }
    // called by the FilterPanel
    public void setChanged( )
    {
        changed = true;
        //offecreen = null
        update( );
    }
    public Dimension calcDimension( )
    {
        Dimension dim = new Dimension(0, 0);
        calcDimension(dim, o);
        return dim;
    }
    public void update( )
    {
        update(this.getGraphics ( ));
    }
    public void update(Graphics screen)
    {
    paint(screen);
    }
    // this function is optimized for scrolling and resizing the
    // window. the offscreen image is only re- allocated if nodes
    // are added to the tree. if the offscreen image is too big,
    // that's no big deal, but if it's too small and is reallocated
    // each time, that's a big performance hit.
```

TABLE 3-continued

FilterableTree.java

```
public void paint(Graphics screen)
{
    if (changed) {
        offscreen = null;
    }
    if (offscreen == null) {
        changed = true;
    }
    if (changed) {
        dimension = calcDimension( );
        offscreen = createImage(dimension.width,
dimension.height);
        Graphics g = offscreen.getGraphics( );
        g.setFont(font);
        g.setColor(backgroundColor);
        g.fillRect(0, 0, dimension.width, dimension.height);
        paint(g, 0, 0);
        getParent( ).doLayout( );
        changed = false;
    }
    Dimension view = size( );
    screen.setColor(backgroundColor);
    if (view . width > dimension . width) {
        screen.fillRect(dimension.width, 0, view.width - dimension.width,
view.height);
    }
    if (view.height > dimension. height) {
        screen.fillRect(O, dimension.height, view.width,
view.height - dimension.height);
    }
    screen.drawImage(offacreen, O, O, this);
    paintVisibleFilterPanels(screen);
}
public void actionPerformed(ActionEvent evt)
{
    //System.out.println(evt.getActionCommand( ));
}
protected void processMouseEvent(MouseEvent event)
{
    if (event.isPopupTrigger( )) {
        handlePopupTrigger(event);
    }
    if (event.getID( ) == MouseEvent.MOUSE_PRESSED) {
        if (((event.getModifiers( ) & InputEvent.BUTTON2_MASK)
>O) ||
            ((event.getModifiers( ) &
InputEvent.BUTTON3_MASK) > 0) ||
            (event.isAltDown( )))
            handlePopupTrigger(event);
        else
            handleMousePressed(event);
    }
}
protected void handlePopupTrigger(MouseEvent event)
{
    int x = event.getX( );
    int y = event.getY( );
    FilterableTreeNode row = findRow(y);
    if (row == null) {
        return;
    }
    if (row.isFilterable( )) {
        filterOn.setState(row.filtering);
        filterOff.setState(!row.filtering);
        popup.show(this, x, y);
        popupRow = row;
    }
}
protected void handleMouse.Pressed(MouseEvent event)
{
    int x = event.getX( );
    int y = event.getY( );
    FilterableTreeNode row = find Row(y);
    if (row == null) return;
    x -= row.xoffset;
    y -= row.yoffset;
    it ((x > TRIGGER_LEFT-1) && (x ~ TRIGGER_LEFT +
TRIGGER_DIMENSION+2) &&
        (y > TRIGGER TOP-1) && (y < TRIGGER_TOP +
TRIGGER_DIMENSION+2)) {
        //System.err.println("trigger");
        //row.setExpanded(!row.expanded);
        row.toggleExpanded( );
        changed = true;
    } else if ((x > ICON_LEFT) &&
        (y > ICON_TOP) && (y ~ ICON_TOP +
ICON_DIMENSION) &&
        (x < TEXT_LEFT +
fontMetrics.stringWidth(row.text))) {
        //if control-click, add this to a vector of currently
        //selected items. otherwise, deselect everyone in the
        //vector, and add just this row back in.
        //FilterableTreeNode root = findRootNode( );
        //if (root.selections == null) {
        // root.selections = new Vector( );
        //}
        //Vector selections = root.selections;
        if (event.isControlDown( )) {
            if (row.selected) {
                row.setSelected(false);
    selections.removeElement(row);
            } else {
                row.setSelected(true);
                selections.addElement(row);
            }
        //} else if (event.isMetaDown( )) {
        // // this tells us if it's a right-click
        // tryPopup(row, x + row.xoffset, y + row.yoffset);
        } else {
            if (!row.selected) {
                deselectAll( );
                row.setSelected(true);
                selections.addElement(row);
            } else {
                // do nothing . . .
            }
        }
        changed = true;
    } else {
        deselectAll( );
        changed = true;
    }
    if (changed) update( );
}
// from ItemListener, handles popup menu events
public void itemStateChanged(ItemEvent event)
{
    //System.err.println(event.getItem( ).getClass( ));
    if (event.getItem( ).equals("Filtering On")) {
        //System.err.println("filter on");
        popupRow.setFiltering(true);
    } else if (event.getItem( ).equals("Filtering Off")) {
//System.err.println("Filter Off");
        popupRow.setFiltering(false);
    }
}
public Dimension getPreferredSize( )
{
    if (dimension == null) {
        dimension = calcDimension( );
    }
    return dimension;
}
protected void deselectAll( )
{
    Enumeration e = selections.elements( );
    while (e.hasMoreElements( )) {
        FilterableTreeNode node = (FilterableTreeNode)
e.nextElement( );
```

TABLE 3-continued

FilterableTree.java

```
            node.setSelected(false);
        }
        selections.removeAllElements( ):
    }
}
``` module FilterTreeDemo.java

This module (see Table 4) defines the class FilterableTreeDemo, which does all the underlying work of putting the parts of the filter tree together and drawing the filter tree in a standard java frame on screen. In this demo case, the structure for the first level-nodes of the tree are hard-coded into the class, and the second-level filterable nodes are read in from an LDIF data file.

To be completely specific, a class, Filterable TreeDemo is defined. This class's purpose is to instantiate a new instance of a FilterableTree named Messaging Server. It also instantiates four FilterableTreeNodes named Users, Folders, Logs, and Alarms, respectively. In addition, the Filterable-TreeDemo class contains a while loop that instantiates hundreds of FilterableTreeNodes beneath the Users node by looping over the user data found in the file users.txt. The data in users.txt is in standard LDIF format.

TABLE 4

FilterableTreeDemo.java

```
import java.awt*;
import java.awt.event.*;
import java.io.*;
public class FilterableTreeDemo extends Frame
{
    static public void main(String args[ ])
    {
        try {
            FileReader fileReader = new FileReader("users.txt");
            BufferedReader reader = new BufferedReader(fileReader);
            Frame frame = new FilterableTreeDemo(reader, null);
        }
        catch (Exception e) {
            e.printStackTrace ( );
        }
    }
    public FilterableTreeDemo(BufferedReader reader, Applet apples)
    throws IOException
    {
        super("Inline Tree Filter Demo");
        *FilterableTree.loadImages(applet);
        FilterableTree tree = new FilterableTree("Messaging Server")
        FilterableTreeNode temp = new FilterableTreeNode("Users");
        temp.setFiltering(true);
        FilterPanel filterPanel = new FilterPanel(temp).
        //filterPanel.invalidate( );
        temp.setFilterPanel(filterPanel);
            tree.addChild(temp);
            //System.err.println(temp.parent);
        String line;
        while ((line = reader.readLine( )) != null) {
            int commaIndex = line.indexOf(",");
            if (commaIndex == -1) break;
            String name = line.substring(4, commaIndex);
            FilterableTreeNode kid = new FilterableTreeNode(name);
            kid.setShowing(false);
            temp.addChild(kid);
            // throw away another line, i only need about 500
            reader.readLine( );
        }
        reader close( );
```

TABLE 4-continued

FilterableTreeDemo.java

```
        temp = new FilterableTreeNode("Folders");
        temp.addChild("hi there");
        tree.addChild(temp);
        temp = new FilterableTreeNode("Logs");
        temp.addChild("leave me alone");
        tree.addChild(temp);
        temp = new FilterableTreeNode("Alarms");
        temp.addChild("nosy, aren't you?");
        tree.addChild(temp);
        ScrollPane sp = new ScrollPane( );
        sp.setSize(350, 450);
        sp.add(tree);
        this.setLayout(new BorderLayout( ));
        //this.resize(350, 450);
        this.move(50, 50);
        this.add(sp);
        this.pack( );
        this.show( );
        this.addWindowListener(new WindowAdapter( ) {
            public void windowClosing(WindowEvent e) {
    //System.exit(O);
                dispose( );
            }
        });
    }
}
``` module FilteringTreeDemoApplet.java

This module (see Table 5) only has one purpose, to define and instantiate an instance of the class FilterableTreeDemo. Invoking this module creates an applet containing the entire working application of filterable trees.

TABLE 5

FilterableTreeDemoApplet.java

```
import java.awt.*;
import java.applet.*;
import java.io.*;
import java.net.*;
public class FilterableTreeDemoApplet extends Applet
{
    public void init( )
    {
        showStatus("Loading users for tree, please wait . . . ");
        try {
            URL url = new URL(getCodeBase( ), "users.txt")
            InputStream inputStream = url.openStream( );
        InputStreamReader inputReader =
        new inputStreamReader(inputStream);
            BufferedReader reader = new BufferedReader(inputReader);
            Frame frame = new FilterableTreeDemo(reader
        }
        catch (Exception e) {
            e.printStackTrace( );
        }
        showStatus("Inline Tree Filter Demo.");
    }
}
```

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. An apparatus for selectively structuring data represented in a hierarchical format, comprising:

a data access facility for hierarchically representing on a display device data stored in electronic format by a data processing system;

an information filtration mechanism comprising an arbitrary search mechanism, responsive to user instructions, for enabling selective display of said data without altering behavior and interaction of said data access facility;

means for determining what filter criteria a user has entered into said information filtration mechanism;

means for traversing through said data; and means for showing only the data that match said filter criteria.

2. The apparatus of claim 1, wherein said data access facility comprises a tree viewer.

3. An apparatus for selectively structuring data represented in a hierarchical tree format, comprising;

a tree viewer for hierarchically representing on a display device data stored in electronic format by a data processing system; and at least one inline tree filter for enabling selective data display without altering behavior and interaction of said tree viewer, said one inline tree filter comprising an arbitrary search mechanism embedded within said tree viewer;

means for determining what filter criteria a user has entered into an at least one inline tree filter text field;

means for traversing through said data;

means for showing only the data that match said filter criteria;

wherein one or more inline tree filters may be embedded directly into any portion of said tree viewer; and wherein a selective set of objects is affected by said inline tree filter.

4. The apparatus of claim 3, said inline tree filter further comprising:

an inline tree filter command displayed in a pop-up menu for inserting an inline tree filter into said tree viewer.

5. The apparatus of claim 3, said inline tree filter search mechanism further comprising:

a type-in text field;

a button responsive to a user gesture or command for operating an inline tree filter; and an optional explanatory data field.

6. The apparatus of claim 3, said inline tree filter search mechanism further comprising:

up and down arrows for browsing search results.

7. The apparatus of claim 3, wherein any available action may be applied to said search results.

8. The apparatus of claim 3, wherein said inline filters are independent of a type of data that appears in said tree viewer, wherein various object types are heterogeneously represented in said tree viewer.

9. The apparatus of claim 3, wherein one or more attributes or properties of said data may be used as critieria upon which said objects are filtered.

10. The apparatus of claim 9, wherein any available attributes may be used as critieria upon which said objects are filtered.

11. The apparatus of claim 3, wherein an arbitrary number of inline tree filters may be inserted into said tree viewer.

12. The apparatus of claim 3, wherein inline tree filters may be placed inside of each other to allow multiple nesting at different levels of said tree viewer.

13. The apparatus of claim 3, wherein filter creation may be accomplished by any of a display-based gesture or a non-cursor based metaphor, including any of a menu, keyboard, and voice.

14. The apparatus of claim 3, wherein said inline tree filter applies an attribute against which it filters and, optionally, a relationship between said attribute and a value.

15. The apparatus of claim 3, further comprising:

a mechanism for selectively enabling and disabling said inline tree filters.

16. A method for selectively structuring data represented in a hierarchical tree format, comprising the steps of:

providing a tree viewer for hierarchically representing on a display device data stored in electronic format by a data processing system;

providing at least one inline tree filter comprising an arbitrary search mechanism embedded within said tree viewer for enabling selective data display without altering behavior and interaction of said tree viewer;

determining what filter criteria a user has entered into an inline tree filter text field;

traversing through said data; and showing only the data that match said filter criteria.

17. The method of claim 16, wherein each node within said tree viewer for which an inline filter is provided has an instance of its own filter panel.

18. The method of claim 16, further comprising the step:

selectively adding or removing data from a tree viewer node with said inline tree filter based on filter criteria.

19. The method of claim 18, further comprising the step of:

dynamically generating contents for said tree viewer by replacing said data with only those data that match said filter criteria.

20. A method for selectively structuring data represented in a hierarchical tree format, comprising the steps of:

attaching a unique filter panel to a tree node, said filter comprising an arbitrary search mechanism;

allowing said filter panel to manipulate a list of child nodes beneath a parent node;

executing a filter method with said filter panel to determine an appropriate list of children that should be made visible; and optionally enabling and disabling filtering capability for parent nodes that support filtering;

wherein said filter method comprising:

determining what filter criteria a user has entered into said filter panel; and traversing through said data.

* * * * *